(12) United States Patent
Lee et al.

(10) Patent No.: US 8,791,951 B2
(45) Date of Patent: Jul. 29, 2014

(54) IMAGE SYNTHESIS APPARATUS AND METHOD SUPPORTING MEASURED MATERIALS PROPERTIES

(75) Inventors: Joo-Haeng Lee, Daejeon (KR); Sung-Soo Kim, Daejeon (KR); Seung Woo Nam, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 742 days.

(21) Appl. No.: 12/627,202

(22) Filed: Nov. 30, 2009

(65) Prior Publication Data

US 2010/0134489 A1 Jun. 3, 2010

(30) Foreign Application Priority Data

Dec. 1, 2008 (KR) .................... 10-2008-0120786
Mar. 27, 2009 (KR) .................... 10-2009-0026296

(51) Int. Cl.
*G09G 5/00* (2006.01)

(52) U.S. Cl.
USPC ........................................ 345/581; 345/426

(58) Field of Classification Search
USPC ................................. 345/581, 426
See application file for complete search history.

(56) References Cited

U.S. PATENT DOCUMENTS

| 7,106,325 | B2 | 9/2006 | Ritter et al. |
| 7,519,114 | B2 | 4/2009 | Kim |
| 2004/0150643 | A1 | 8/2004 | Borshukov |
| 2006/0132486 | A1 | 6/2006 | Kim et al. |
| 2007/0018994 | A1 | 1/2007 | Sekine |
| 2010/0277479 | A1 | 11/2010 | Lee et al. |

FOREIGN PATENT DOCUMENTS

| EP | 2 088 559 | 8/2009 |
| JP | 2007-026312 | 2/2007 |
| JP | 2007-140820 | 6/2007 |
| JP | 2008-129950 | 6/2008 |
| KR | 10-2006-0070174 | 6/2006 |
| KR | 10-0901270 | 6/2009 |

OTHER PUBLICATIONS

Veach et al.; "Optimally combining sampling techniques for Monte Carlo rendering"; 1995; SIGGRAPH '95 Proceedings of the 22nd annual conference on Computer graphics and interactive techniques; pp. 419-428.*
Furukawa et al.; "Cut-and-Paste Editing Based on Constrained B-spline Volume Fitting"; 2003; IEEE CGI '03; pp. 1-4.*
"A Data-Driven Reflectance Model," Wojciech Matusik et al., ACM Transactions on Graphics, vol. 22, No. 3, pp. 759-769, Jun. 2003.
"Experimental Analysis of BRDF Models," Addy Ngan et al., Eurographics Symposium on Rendering 2005, 1pg.

* cited by examiner

*Primary Examiner* — Kee M Tung
*Assistant Examiner* — Peter Hoang
(74) *Attorney, Agent, or Firm* — Staas & Halsey LLP

(57) ABSTRACT

An image synthesis apparatus supporting measured materials properties includes an input unit for receiving from a user selected information on material information processing, sampling and rendering; a material information processing unit for converting measured material data into raw material data, performing material model fitting on the raw material data to generate material information and performing material mixing on the material information to generate mixed material information, wherein the model fitting and the material mixing is performed according to the selected information; and a sampling unit for sampling the raw material data to generate sampling information. The apparatus further includes a materials properties rendering unit for rendering scene information contained in the selected information, the mixed material information and the sampling information to generate surface material information; and an output unit for visualizing the material information and the surface material information.

20 Claims, 8 Drawing Sheets

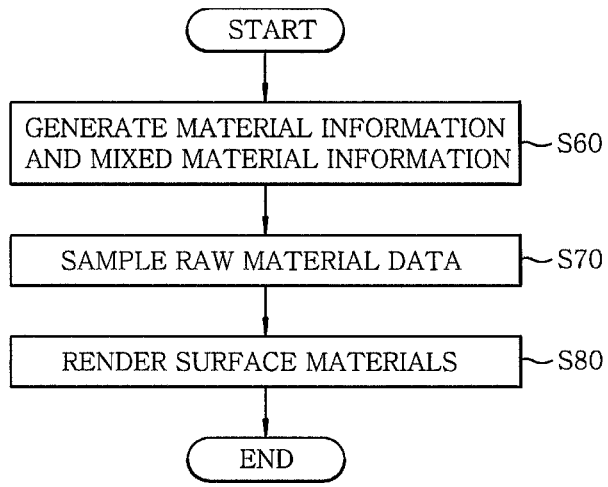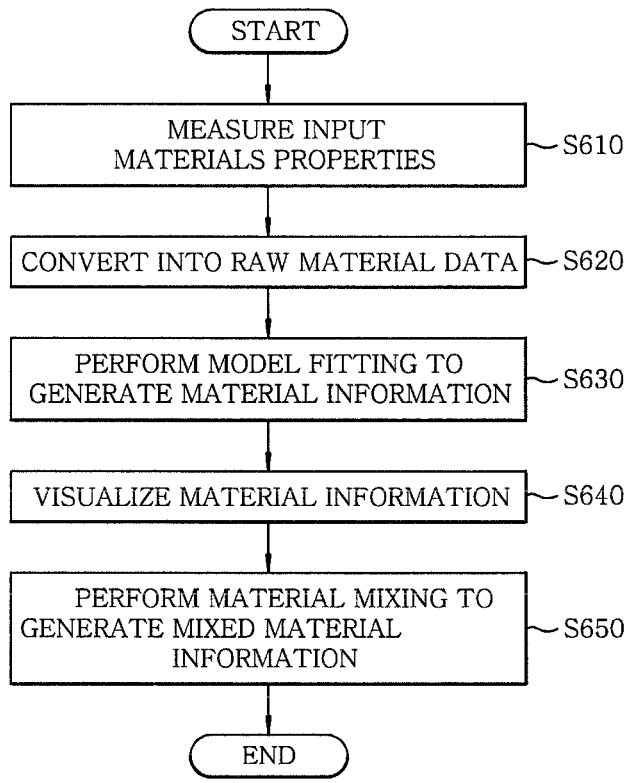

IMAGE SYNTHESIS APPARATUS AND METHOD SUPPORTING MEASURED MATERIALS PROPERTIES

CROSS-REFERENCE(S) TO RELATED APPLICATION(S)

The present invention claims priority of Korean Patent Application No. 10-2008-0120786, filed on Dec. 1, 2008, and Korean Patent Application No. 10-2009-0026296, filed on Mar. 27, 2009, which are incorporated herein by reference.

FIELD OF THE INVENTION

The present invention relates to an image synthesis apparatus and method supporting measured materials properties; and, more particularly, to an image synthesis apparatus and method supporting measured materials properties to render surface materials in digital image synthesis fields.

BACKGROUND OF THE INVENTION

With rapid development of three-dimensional computer graphics technology in recent years, image synthesis is enabled at a level approaching or equaling photographed images. Especially, image synthesis is being actively used for design visualization using various advanced materials in fields of, e.g., mobile phones, home electronics, fashion, cars and architecture, and used in image special effect fields requiring synthesis with real pictures. However, in order to produce such images, very long computing time and designer's working time are still required. Thus, a lot of researches and technical developments are being made to solve this problem.

Surface materials of scene elements are one of important factors determining reality of CGI (Computer Generated Imagery). Especially, there are many things to be taken into consideration in order to render materials whose surface physical phenomenon is complex, e.g., body parts such as skin and hair, delicate cloths, mixed paint. An object coated with such materials may change in surface color or brightness depending on a direction in which the object is viewed (viewpoint direction) and a direction in which light is irradiated (light source direction). In particular, it is important to render properties information of a material having a complex directionality.

Various techniques have been developed to render the properties information. For example, a surface of a real object is photographed to obtain properties of its material as raw data. Also, a physical model and/or an empirical model are established and expressed in mathematical equations. However, there is a problem that, although the raw data can accurately render the properties of surface materials, its size is too big to be used in a network render farm environment using hundreds to thousands of CPUs (Central Processing Units). Further, not only there is a limitation in rendering delicate surface materials properties only by using a mathematical equation based model, but also the amount of calculation increases.

It is also important to edit and modify existing material information or produce a new material. This is because various experiments may be made on measured materials for improvements by using the measured materials properties only as reference data. To this end, an editing system supporting mixing of materials is required.

In general, detailed materials properties information has a large volume or requires a large amount of computation. Therefore, there is a demand for a method in which precise material information is used in a highly visible and large area while simplified material information is used in a poorly visible and small area. For this, it is necessary to support material information in a multi-resolution way.

Regarding this, related researches on, e.g., BRDF (Bi-directional Reflectance Distribution Function), BTF (Bi-directional Texture Function) and PTM (Polynomial Texture Map), are being conducted.

SUMMARY OF THE INVENTION

In view of the above, the present invention provides an image synthesis apparatus and method supporting measured materials properties to render surface materials in digital image synthesis fields.

In accordance with an aspect of the present invention, there is provided an image synthesis apparatus supporting measured materials properties, the apparatus including:

an input unit for receiving from a user selected information on material information processing, sampling and rendering;

a material information processing unit for converting measured material data into raw material data, performing material model fitting on the raw material data to generate material information and performing material mixing on the material information to generate mixed material information, wherein the model fitting and the material mixing is performed according to the selected information;

a sampling unit for sampling the raw material data to generate sampling information;

a materials properties rendering unit for rendering scene information contained in the selected information, the mixed material information and the sampling information to generate surface material information; and an output unit for visualizing the material information and the surface material information.

Preferably, the material information processing unit includes: a material measuring unit for measuring materials properties from physical material samples and materials properties models to obtain the measured material data; a material information pre-processing unit for converting the measured material data into the raw material data; a material model fitting unit for extracting model parameters while performing the material model fitting; a material information generating unit for performing the material mixing by using the extracted model parameters to generate the mixed material information; and a material information management unit for storing and managing the material information and the mixed material information.

Preferably, the material model fitting unit includes at least one of a tabular material model fitting unit, a B-spline material model fitting unit, an empirical material model fitting unit and a physical material model fitting unit.

Preferably, the B-spline material model fitting unit performs multi-dimensional B-spline volume fitting by using model fitting control information contained in the selected information and the raw material data.

Preferably, the material information generating unit includes: a material information editing unit for providing via the input unit or the output unit a user interface to receive the selected information on the material mixing; and a material information calculation unit for performing at least one of linear mixing, partial mixing, hierarchical mixing and composite mixing according to the selected information received via the user interface to generate the mixed material information.

Preferably, the material information calculation unit includes: at least one of a linear mixing calculator for performing the linear mixing, a partial mixing calculator for performing the partial mixing, a hierarchical mixing calculator for performing the hierarchical mixing and a composite mixing calculator for performing the composite mixing; a multi-resolution calculator for adjusting image precision according to characteristics of geometric elements of a corresponding scene; and a color adjustment calculator for replacing color elements and adjusting color intensities.

Preferably, the sampling unit includes: a sampling pre-processing unit having a tabular cumulative density function calculator for generating a tabular-type cumulative density function on the raw material data and calculating an inverse function of the cumulative density function; and a sampling calculation unit having a tabular sampling calculator for sampling important incident angles via a random-number generator by applying the cumulative density function to input vector sampling and a B-spline sampling calculator for generating the sampling information by performing B-spline volume fitting on the sampled important incident angles.

Preferably, the sampling pre-processing unit calculates a marginal density function by mathematically integrating B-spline volumes of the raw material data.

Preferably, the sampling pre-processing unit has an empirical cumulative density function calculator and a physical cumulative density function calculator for calculating an empirical cumulative density function and a physical cumulative density function, respectively, for the raw material data represented by mathematical equations; and wherein the sampling calculation unit has an empirical sampling calculator for sampling the empirical cumulative density function and a physical sampling calculator for sampling the physical cumulative density function.

Preferably, the materials properties rendering unit includes: a rendering unit for rendering the scene information, the mixed material information and the sampling information to generate the surface material information; and a surface material rendering unit for rendering the surface material information to generate an image and providing the image to the output unit.

In accordance with another aspect of the present invention, there is provided an image synthesis method supporting measured materials properties, the method comprising:

converting measured material data into raw material data;

generating material information by performing material model fitting on the raw material data according to selected information received from a user;

generating mixed material information by performing material mixing on the material information according to the selected information;

generating sampling information by sampling the raw material data; and generating surface material information by rendering scene information contained in the selected information, the mixed material information and the sampling information.

Preferably, said generating the mixed material information includes performing the material mixing by using model parameters extracted while performing the material model fitting.

Preferably, the material model fitting includes at least one of tabular material model fitting, B-spline material model fitting, empirical material model fitting and physical material model fitting.

Preferably, the B-spline material model fitting is multi-dimensional B-spline volume fitting using model fitting control information contained in the selected information and the raw material data.

Preferably, the material mixing includes at least one of linear mixing, partial mixing, hierarchical mixing and composite mixing.

Preferably, said generating the mixed material information includes: adjusting image precision according to characteristics of geometric elements of a corresponding scene; replacing color elements; and adjusting color intensities.

Preferably, said generating the sampling information includes: generating a tabular-type cumulative density function on the raw material data; calculating an inverse function of the cumulative density function; sampling important incident angles via a random-number generator by applying the cumulative density function to input vector sampling; and performing B-spline volume fitting on the sampled important incident angles to generate the sampling information.

Preferably, said calculating the inverse function includes calculating a marginal density function by mathematically integrating B-spline volumes of the raw material data.

Preferably, said calculating the inverse function includes calculating an empirical cumulative density function and a physical cumulative density function for the raw material data represented by mathematical equations; and wherein said performing the B-spline volume fitting includes sampling the empirical cumulative density function calculator and sampling the physical cumulative density function.

The image synthesis method may further include: generating an image by rendering the surface material information; and visualizing the image.

According to the present invention, a material properties rendering type supporting all of various material models based on mathematical equations is employed. Therefore, various types of material properties information including measured material properties information can be used and edited in image synthesis, a large volume of raw data can be stored in a decreased data volume, and computation can be simplified. Further, various mixing operations of materials properties, multi-resolution rendering and adjustment of colors and intensities can be supported.

BRIEF DESCRIPTION OF THE DRAWINGS

The above features of the present invention will become apparent from the following description of embodiments, given in conjunction with the accompanying drawings, in which:

FIG. 6 illustrates a flowchart of an image synthesis method using the image synthesis apparatus of FIG. 1; and FIGS. 7 to 9 respectively illustrate a flowchart of a detailed procedure of the image synthesis method of FIG. 6.

DETAILED DESCRIPTION OF THE EMBODIMENT

Hereinafter, embodiments of the present invention will be described in detail with reference to the accompanying drawings, which form a part hereof.

Figure 1:
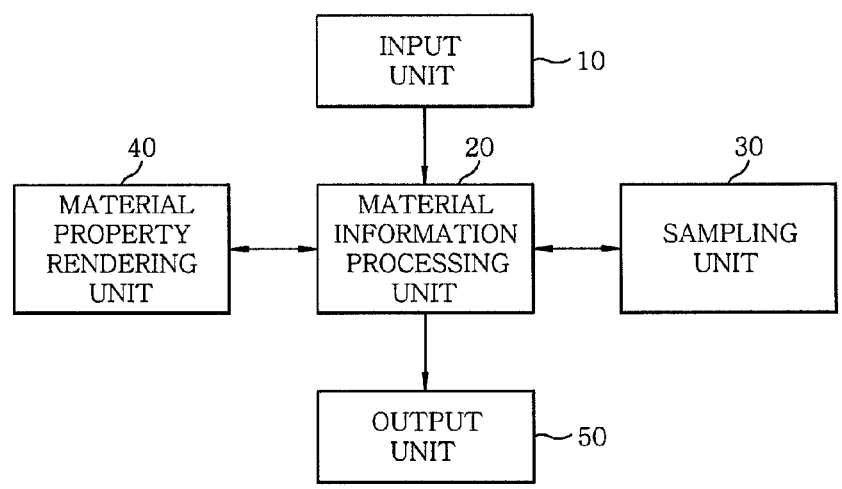
FIG. 1 illustrates a block diagram of an image synthesis apparatus supporting measured materials properties in accordance with an embodiment of the present invention.

FIG. 1 illustrates a block diagram of an image synthesis apparatus supporting measured materials properties in accordance with an embodiment of the present invention.

As shown in FIG. 1, the image synthesis apparatus of the present invention includes an input unit 10, a material information processing unit 20, a sampling unit 30, a materials properties rendering unit 40 and an output unit 50.

The input unit 10 is a user interface for receiving from a user selected information on material information processing, sampling and rendering.

The material information processing unit 20 converts measured data of input materials properties into raw material data and generates material information and mixed material information via material model fitting and material mixing, respectively, according to the selected information received via the input unit 10.

The sampling unit 30 generates sampling information by sampling the raw material data obtained by the material information processing unit 20.

The materials properties rendering unit 40 renders surface materials by rendering scene information contained in the selected information received via the input unit 10, the material information obtained by the material information processing unit 20 and the sampling information obtained by the sampling unit 30.

The output unit 50 visualizes the material information having been subjected to the material model fitting in the material information processing unit 20 or outputs the surface materials rendered by the materials properties rendering unit 40.

Figure 2A:
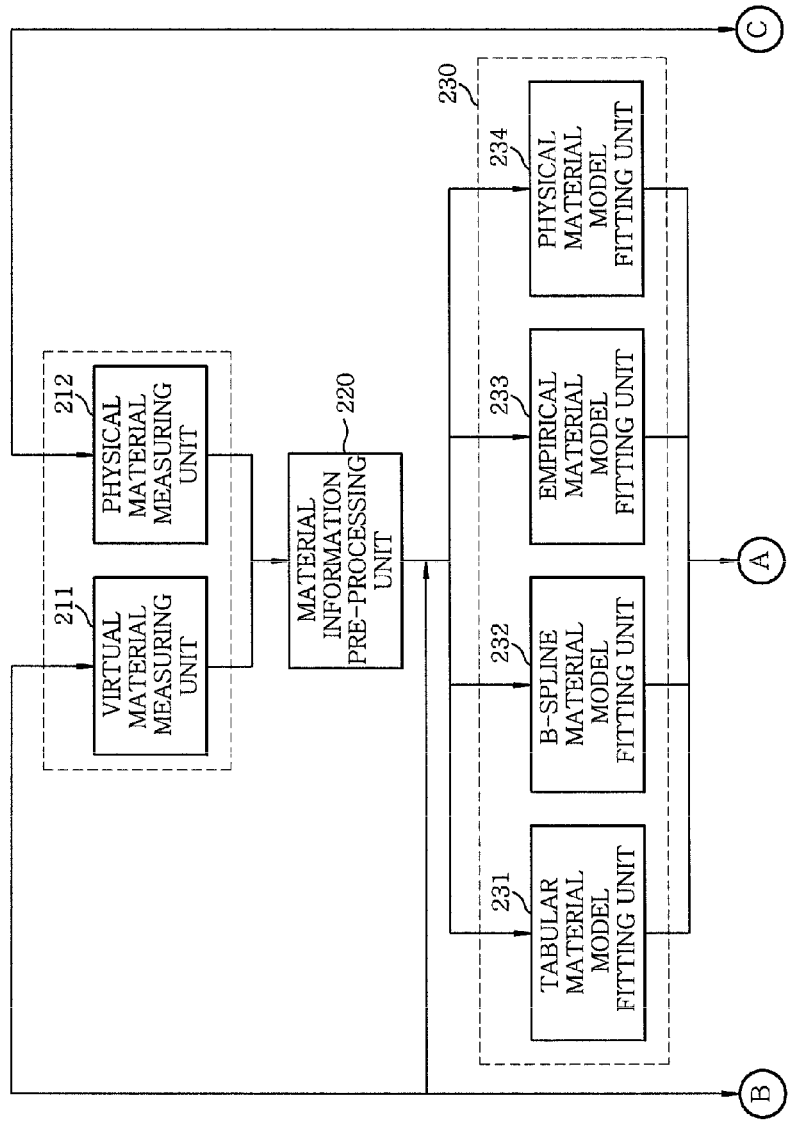
FIGS. 2A and 2B illustrate a block diagram of the material information processing unit of FIG. 1.
Figure 2B:
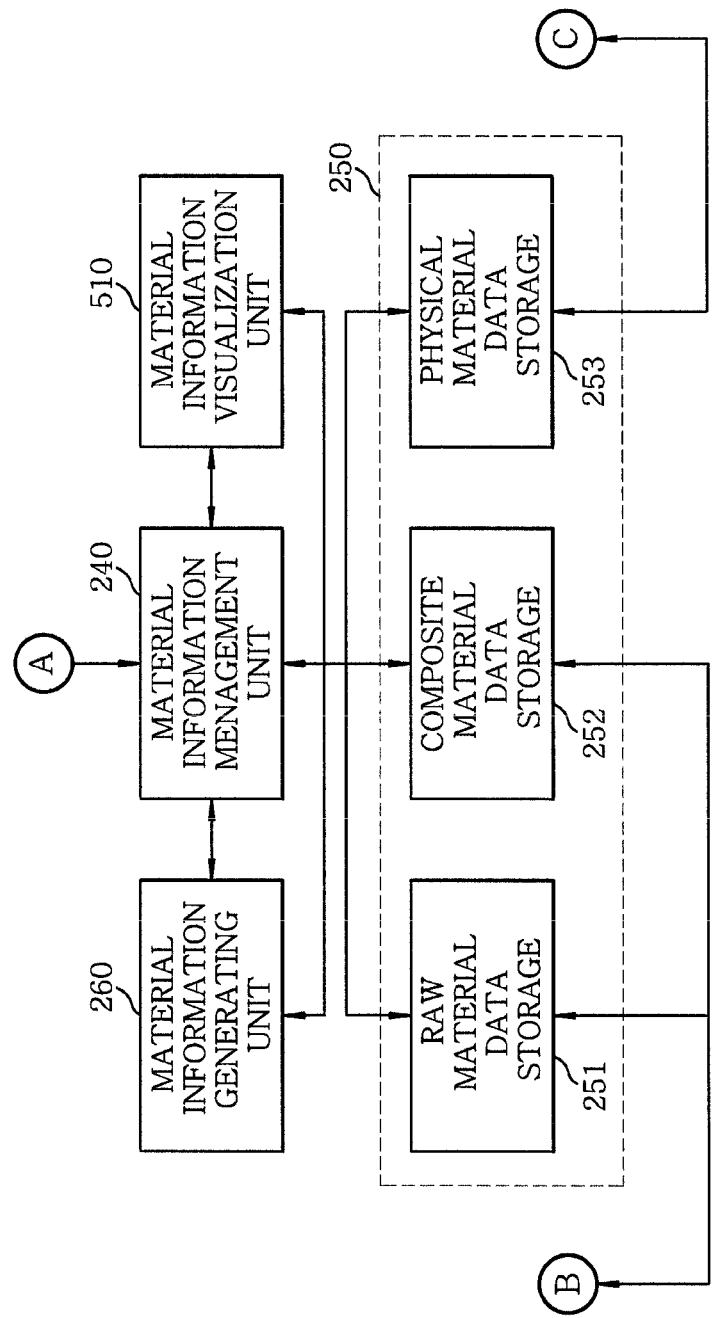

FIGS. 2A and 2B illustrate a block diagram of the material information processing unit of FIG. 1.

As shown in FIGS. 2A and 2B, the material information processing unit 20 includes a material measuring unit 210, a material information pre-processing unit 220, a material model fitting unit 230, a material information management unit 240, a material data storage 250 and a material information generating unit 260. A material information visualization unit 510 in FIG. 2B belongs to the output unit 50.

The material measuring unit 210 has a physical material measuring unit 212 for measuring materials properties information from physical material samples and a virtual material measuring unit 211 for measuring materials properties information from material models.

The material information pre-processing unit 220 converts the materials properties information measured by the material measuring unit 210 into raw material data.

The material model fitting unit 230 extracts model parameters from the raw material data by performing the material model fitting according to the selected information received via the input unit 10. The material model fitting unit 230 has a tabular material model fitting unit 231, a B-spline material model fitting unit 232, an empirical material model fitting unit 233 and a physical material model fitting unit 234.

The material information management unit 240 stores in the material data storage 250 material information and the mixed material information output from the material model fitting unit 230 and from the material information generating unit 260. The material information management unit 240 manages the material information stored in the material data storage 250 and also provides them to the materials properties rendering unit 40 and the material information visualization unit 510. The material data storage 250 has a raw material data storage 251, a composite material data storage 252 and a physical material data storage 253.

The material information generating unit 260 generates the mixed material information by performing material mixing on the material information according to the selected information received via the input unit 10.

Figure 3:
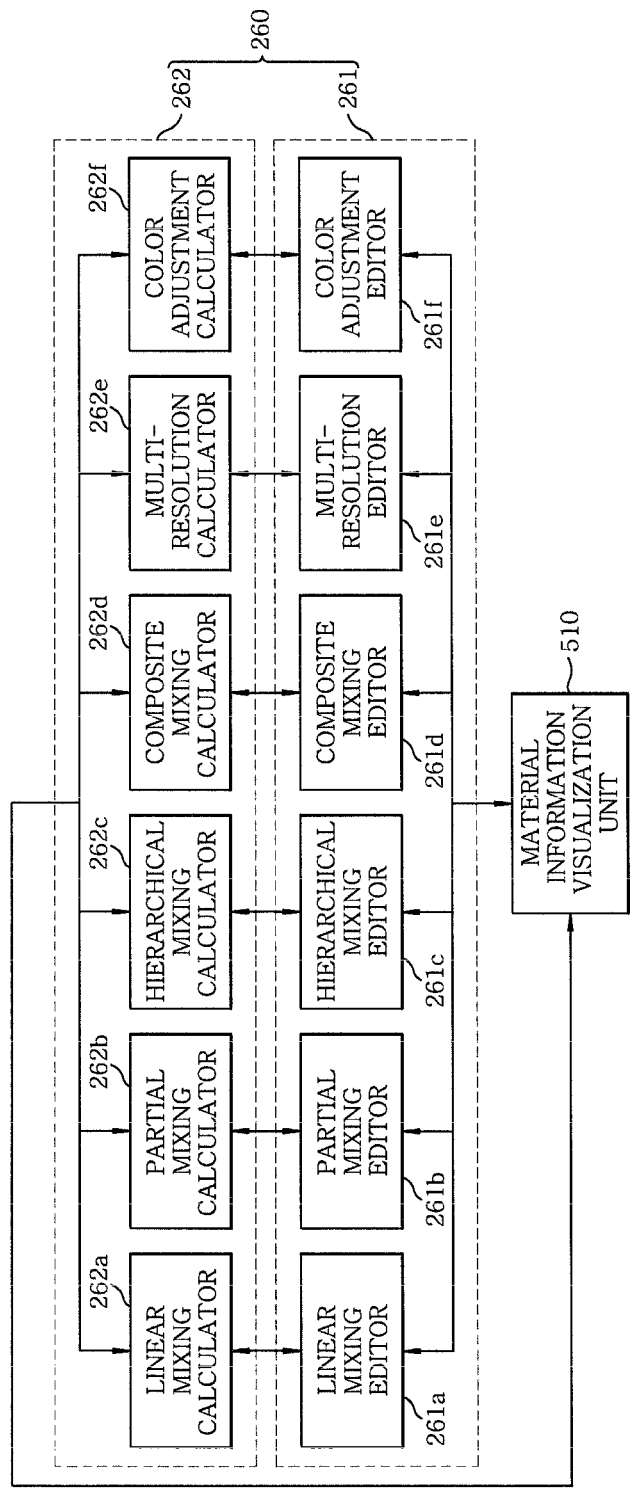
FIG. 3 illustrates a block diagram of the material information generating unit of FIG. 2B.

FIG. 3 illustrates a block diagram of the material information generating unit of FIG. 2B.

As shown in FIG. 3, the material information generating unit 260 includes a material information editing unit 261 for providing, through the input unit 10 or the output unit 50, a user interface to receive the selected information required for the material mixing; and a material information calculation unit 262 for generating the mixed material information by performing one of linear mixing, partial mixing, hierarchical mixing and composite mixing according to the selected information received via the user interface.

The material information editing unit 261 includes a linear mixing editor 261a for linear mixing, a partial mixing editor 261b for partial mixing, a hierarchical mixing editor 261c for hierarchical mixing, a composite mixing editor 261d for composite mixing, a multi-resolution editor 261e for adjusting image precision according to characteristics of geometric elements of a scene and a color adjustment editor 261f for replacing color elements or adjusting color intensities. The material information calculation unit 262 has a linear mixing calculator 262a for linear mixing, a partial mixing calculator 262b for partial mixing, a hierarchical mixing calculator 262c for hierarchical mixing, a composite mixing calculator 262d for composite mixing, a multi-resolution calculator 262e for adjusting image precision according to characteristics of the geometric elements of a scene and a color adjustment calculator 262f for replacing color elements or adjusting color intensities.

Figure 4:
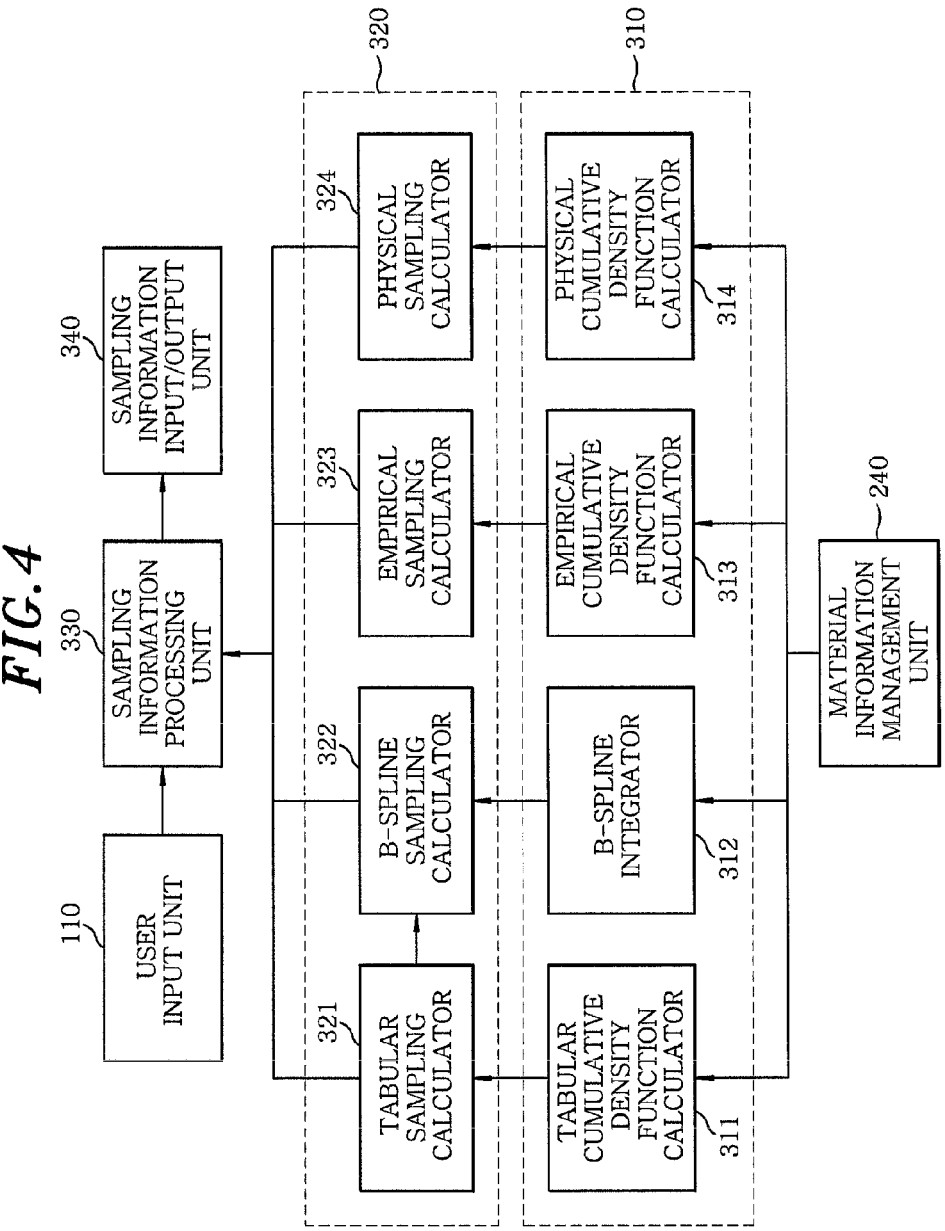
FIG. 4 illustrates a block diagram of the sampling unit of FIG. 1.

FIG. 4 illustrates a block diagram of the sampling unit of FIG. 1.

As shown in FIG. 4, the sampling unit 30 includes a sampling pre-processing unit 310, a sampling calculation unit 320, a sampling information processing unit 330 and an sampling information input/output unit 340.

The sampling pre-processing unit 310 has a tabular cumulative density function calculator 311 for generating a tabular-type cumulative density function for the raw material data to calculate an inverse function. The sampling calculation unit 320 has a tabular sampling calculator 321 for sampling important incident angles via a random-number generator by applying the cumulative density function to sampling of input vectors, and a B-spline sampling calculator 322 for generating the sampling information by performing B-spline volume fitting on a sampling result of the important incident angles. The sampling information processing unit 330 collects sampling information, which is the sampling result from the sampling calculation unit 320, and provides the collected sampling information to the material information processing unit 20 and the materials properties rendering unit 40 via the sampling information input/output unit 340.

The sampling pre-processing unit 310 further has a B-spline integrator 312, an empirical cumulative density function calculator 313 and a physical cumulative density function calculator 314. The sampling calculation unit 320 further has an empirical sampling calculator 323 and a physical sampling calculator 324.

A user input unit 110 in FIG. 4 belongs to the input unit 10. A user can use the user input unit 110 when inputting various selected information on sampling.

Figure 5:
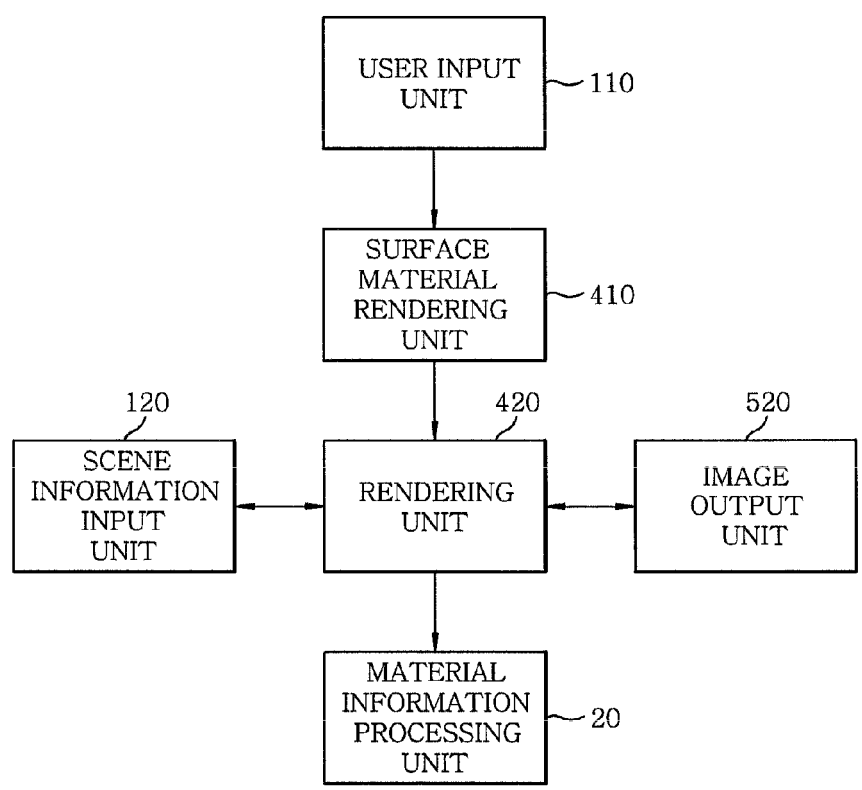
FIG. 5 illustrates a block diagram of the materials properties rendering unit of FIG. 1.

FIG. 5 illustrates a block diagram of the materials properties rendering unit of FIG. 1.

In FIG. 5, a scene information input unit 120 belongs to the input unit 10 and an image output unit 520 belongs to the output unit 50. Further, a user can use the user input unit 110 when inputting various selected information on rendering.

As shown in FIG. 5, the materials properties rendering unit 40 includes a rendering unit 420 for performing rendering by using scene information inputted through the scene information input unit 120, the material information generated by the material information processing unit 20 and the sampling information generated by the sampling unit 30; and a surface material rendering unit 410 for rendering surface materials in a form of an image through the image output unit 520 based on a result of the rendering.

Hereinafter, an image synthesis process performed by the image synthesis apparatus having the above-described configuration will be described with reference to FIGS. 6 to 13. The following description will be made of an embodiment in which surface material information is given in a form of a BRDF (Bidirectional Reflectance Distribution Function).

FIG. 6 illustrates a flowchart of an image synthesis method using the image synthesis apparatus of FIG. 1.

In the image synthesis method, measured data of input materials properties is converted into raw material data and material information and mixed material information are generated by performing material model fitting on the raw material data and material mixing on the material information, respectively, according to inputted selected information (step S60). Then, sampling information is generated by sampling the raw material data according to the selected information (step S70), and surface materials are rendered by performing rendering using scene information contained in the selected information, the material information and the sampling information (step S80). Below, the steps S60, S70 and S80 will be described in more detail.

Figure 8:
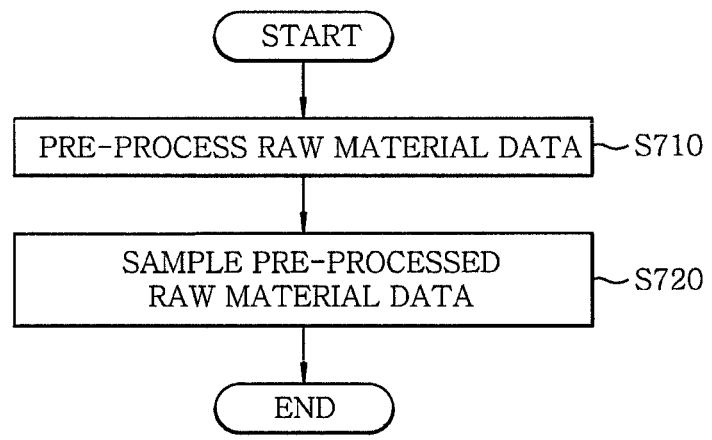
Figure 9:
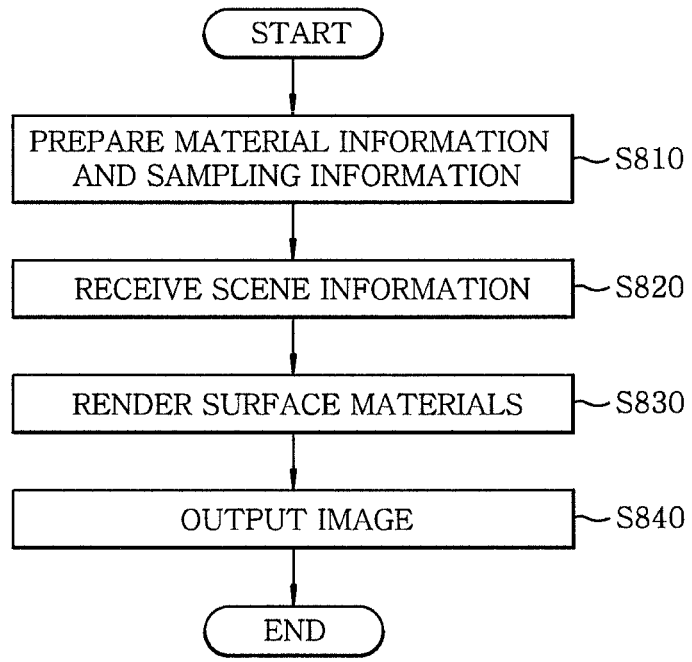

FIGS. 7 to 9 respectively illustrate a flowchart of a detailed procedure of the image synthesis method of FIG. 6.

A BRDF value refers to a ratio of the amount of reflected light to the amount of incident light. Surface materials properties are determined by which direction incoming light is reflected and how much light is reflected. Therefore, the BRDF is a very important factor in determining surface materials properties. Other important factors include the amount, frequency and direction of the incident light.

The basic BRDF is defined by two vectors with respect to single point on a surface. These two vectors include an incident light unit vector $\omega_i$ from the point to a light source and a reflected light unit vector $\omega_e$ from the point to an eye or camera.

A spatial unit vector $\omega$ is represented by two variables on a polar coordinate system, i.e., $\omega=(\theta,\phi)$, where $\theta$ is an inverse altitude measured from a zenith and $\phi$ is an azimuth. The inverse altitude $\theta$ ranges from 0° to 90°, and therefore domain of a basic BRDF is expressed by a four-dimensional function defined by two unit vectors as $(\theta_e,\phi_e;\theta_i,\phi_i)$.

An extended BRDF may be defined by location and temperature of a surface and a light source frequency in addition to two unit vectors. Thus, the extended BRDF is a five or more dimensional function.

Material information used in the present invention is not affected by the dimension of the domain of a BRDF. That is, it is advantageous that the material information is extendable for an arbitrary dimension. This is because a high-dimensional B-spline volume is used as a basic tool for rendering materials properties.

Generally, B-spline is used for rendering a curve or curved surface in computer graphics or CAD (Computer Aided Design). The B-spline is one-dimensional in case of representing a curve while two-dimensional in case of representing a curved surface. That is, dimension of the B-spline is consistent with the minimum number of parameters required for rendering a curve or a curved surface, i.e., the dimension of the domain. In the present invention, a conventional B-spline is extended to a three or more dimensional one for use, which is called a B-spline volume.

The material information processing unit 20 generates various types of material information that can be used in the materials properties rendering unit 40. The material rendering types largely includes a tabular type for listing measured material information in a raw form, a B-spline type, empirical (phenomenal) models such as phong, blinn, ward, and lafourtune models and physical models such as cook-torrance and oren-nayar.

FIG. 7 illustrates a flowchart of material information generation procedure in the method of FIG. 6.

The material measuring unit 210 measures input materials properties (step S610). The physical material measuring unit 212 measures a real BRDF of a sample by using a camera or spectroscope, and the virtual material measuring unit 211 calculates a virtual BRDF by using, e.g., user-specified values, values obtained from conventional mathematical/physical models and mixed complex material models.

The material information pre-processing unit 220 converts the data measured by the material measuring unit 210 into raw material data, and provides it to the material model fitting unit 230 (step S620).

The material model fitting unit 230 generates, from the raw material data, material information of one type among a tabular material model, a B-spline material model, an empirical material model and a physical material model. For example, material data of B-spline volume type can be generated. To generate B-spline volume type material data, the material model fitting unit 230 performs B-spline volume fitting on raw data, e.g., tabular type measured materials properties, inputted or specified by the user, a mathematical material model, e.g., a lafortune model, and a materials properties network model, e.g., shader network, and then outputs the B-spline volume type material data.

To be more specific, the material model fitting unit 230 performs model fitting for each material on the raw material data provided from the material information pre-processing unit 220 by using the tabular material model fitting unit 231, the B-spline material model fitting unit 232, the empirical material model fitting unit 233 and the physical material model fitting unit 234, thereby extracting model parameters (step S630). For example, roughness of a surface is extracted in case of a word model.

The material information management unit 240 stores the model parameters extracted by the material model fitting unit 230 in the raw material data storage 251, the composite material data storage 252 and the physical material data storage 253 of the material data storage unit 250. The physical material data storage unit 253 stores both of real material samples and meta information.

Suppose that the user selects via the input unit 10 B-spline volume fitting and specifies fitting control information required for the B-spline volume fitting, e.g., the number of control points, a range of error (an acceptable error range) and a degree. For example, if 20, 80, 20, and 80 control points are respectively used for $\theta_e$, $\phi_e$, $\theta_i$ and $\phi_i$, a three-dimensional basis function is used and an error range of 0.01 is specified, a good result can be obtained.

The B-spline material model fitting unit 232 performs a fitting operation based on the raw material data and fitting control information to output B-spline volume rendering information, e.g., control points and knot vectors. The material information management unit 240 stores the material information in the composite material data storage 252. Here, the raw material data storage 251 stores the raw material data in a tabular form, and the physical material data storage 253 stores both of real material samples and meta information. An index becomes $\theta_e$, $\phi_e$, $\theta_i$ and $\phi_i$, and a data value is a numerical value that represents a reflectance. In case of using an RGB color model, three real number values are stored. For example, in case of using ninety inverse altitudes and three hundred and sixty azimuths, 3,149,280,000 (90×360×90×360×3) real numbers are stored.

The material information visualization unit 510 of the output unit 50 receives from the material information management unit 240 the material information having been subjected to the model fitting, and visualizes the received material information, i.e., a material model, on a lobe on a spherical coordinate system or on a parameter surface (step S640). The overall shape may be represented in three-dimension, and a two-dimensional sectional representation may be convenient for editing characteristics. The material information visualization unit 510 is applied to the checking of measured and fitting information and the editing of the material information.

The material information generating unit 260 provides functions for linear/partial/hierarchical/composite mixing calculations, multi-resolution material properties information generation, color adjustment-based calculations and editing on the material information having been subjected to the model fitting, thereby generating mixed material information to allow the materials properties rendering unit 40 to render materials properties based on the mixed material information (step S650). To this end, the material information generating unit 260 includes the material information editing unit 261 and the material information calculation unit 262. The material information editing unit 261 has the linear mixing editor 261a, the partial mixing editor 261b, the hierarchical mixing editor 261c, the composite mixing editor 261d, the multi-resolution editor 261e and the color adjustment editor 261f. The material information calculation unit 262 has the linear mixing calculator 262a, the partial mixing calculator 262b, the hierarchical mixing calculator 262c, the composite mixing calculator 262d, the multi-resolution calculator 262e and the color adjustment calculator 262f.

Linear mixing refers to generating intermediate material information by interpolating two material information. For example, gold material information and plastic material information are mixed together to generate intermediate material information. For material mixing, rendering types of two materials need to be identical. For example, a phong material and a lafortune material are respectively converted into a B-spline representation, thereby mixing the materials. If their material type is identical, their corresponding material model parameters are simply interpolated. A user interface for material mixing is provided by the material information editing unit 261 via the input unit 10 and/or the output unit 50, and an actually required calculation is performed in the material information calculation unit 262. For example, the material information editing unit 261 can provide a user interface screen via the material information visualization unit 510 of a touch screen type.

Other types of material mixing are performed in a similar manner. Partial mixing refers to separating and mixing the properties of various materials by angles, i.e., mixing the properties in units of partial angles. For example, material information having plastic-like characteristics for light incident from above and gold-like characteristics for light incident from below can be made through the partial mixing. Hierarchical mixing is more complex. Actually, calculation for processing dispersion of light considering a vertical order and thicknesses of materials needs to be added. Composite mixing is for processing the linear, partial and hierarchical mixings in a combined manner or further adding materials properties thereto.

The multi-resolution calculator 262e allows image precision adjustment according to characteristics of geometric elements of a scene to which materials are applied, and is mainly applied to the B-spline rendering. According to the user's request, B-spline volume BRDFs having different numbers of control points are output. This is for improving calculation performance of the rendering unit 420 forming the materials properties rendering unit 40. It is efficient to use a simplified BRDF in order to render the material properties of an object of a scene far from a camera. To this end, the user specifies the maximum and minimum number of control points and levels of multi-resolution via the user interface provided by the multi-resolution editor 261e. For example, if four levels are specified, curve fitting is performed while changing the number of control points as (20,80,20,80), (15,60,15,60), (10,40,10,40) and (5,20,5,20).

The color adjustment calculator 262f supports replacing of color elements and color intensity adjustment for simple editing via the user interface provided by the color adjustment editor 261f.

In most of recent rendering calculation, a statistical method such as Monte Carlo integration is used. In this method, samples are taken, function values for these samples are calculated and their average value is obtained to approximate integral values. At this time, calculation efficiency depends on how the samples are generated. Especially, in case of an importance sampling, relatively many samplings are performed for important areas that exert great effects on the integral values, i.e., domain areas with large function values.

To solve this problem, the sampling pre-processing unit 310 generates samples in proportion to BRDF values.

In case of materials properties, a lot of samplings need to be done in areas where the BRDF values are large. The BRDF values are calculated based on a color model. For example, when RGB colors are converted into XYZ colors, the Y values can be regarded as magnitudes of the BRDF values. In some cases, sampling can be done individually for each color element of RGB or for each frequency.

Samples required for rendering are a series of vectors. That is, under a situation where the direction of reflection of light toward a camera or eye is determined, ray tracing or path tracing is carried out by performing sampling mainly in the direction of incident angle at which relatively much light is reflected.

The vectors are represented on a polar coordinate system by using an altitude and an azimuth. That is, it is impossible to generate geometrically uniform vectors (perform uniform hemisphere sampling) with respect to one point only by a one-dimensional random number generator provided by a general computer. Although a conversion technique has been developed for this case, if its shape is not simple like a BRDF, a conversion technique using a marginal density function needs to be employed.

FIG. 8 illustrates a flowchart of material information sampling procedure in the method of FIG. 6.

In the present invention, marginal density functions for inverse altitudes and azimuths of BRDF raw data are calculated, and stored in a data structure, e.g., a hash table, so that they can be retrieved by using an inverse function. At this time, the tabular cumulative density function calculator 311 uses cosine values of the inverse altitudes as weights due to the characteristics of a rendering equation (step S710).

Then, inverse function values for an input of the one-dimensional random number generator having a range from zero to one are easily found, and resultantly the tabular sampling calculator 321 of the sampling calculator 320 uses these inverse function values in the sampling of input vectors.

At this time, the B-spline sampling calculator 322 applies B-spline volume fitting in order to prevent the volume of a raw sampling table from becoming extremey large. That is, an inverse function retrieval speed can be improved by performing the B-spline volume fitting on the raw sampling table and storing only knot vectors and control points in the data structure, e.g., a hash table (step S720). For more accurate calculation, the marginal density function can be calculated directly by mathematically integrating the B-spline volumes via the B-spline integrator 312. For mathematical integration, integration of basis functions can be used.

Although material information represented by mathematical equations needs not undergo additional processes since a cumulative density function is also mathematically defined, the material information may undergo additional calculation process via the empirical cumulative density function calculator 313 or the physical cumulative density calculator 314 to speed up the calculation, and is sampled by the empirical sampling calculator 323 or the physical sampling calculator 324.

The sampling information processing unit 330 collects sampling information, which is a result of sampling performed by the sampling calculation unit 320, and provides the sampling information to the material information processing unit 20 and the materials properties rendering unit 40 via the sampling information input/output unit 340.

FIG. 9 illustrates a flowchart of surface material rendering procedure in the method of FIG. 6.

The material information is prepared by the material information processing unit 20 and the sampling information is prepared by the sampling unit 30 (step S810), and scene information is given via the scene information input unit 120 (step S820). The materials properties rendering unit 40 renders surface materials in the rendering unit 420 by using the scene information (step S830), and renders materials properties via the image output unit 520 forming the output unit 50 based on the rendering result (step S840). At this time, the scene information input via the scene information input unit 120 may include all elements, e.g., a shape of the surface, lighting, a camera and texture, in addition to the material information. Of course, even for a general shader network, which is not the BRDF type, scene information may be input and processed by the rendering unit 420. The surface material rendering unit 410 outputs the rendering result of the rendering unit 420 in the form of an image via the image output unit 520.

In case where BRDF data is input, the material information calculation unit 262 of the material information processing unit 20 delivers BRDF values corresponding to inverse altitudes and azimuths.

Regarding the materials properties information of B-spline volume type, a B-spline is evaluated in the material information calculation unit 262 to find the BRDF values. A fast B-spline evaluation needs to be implemented in the material information calculation unit 262, which can be implemented by computer software, a GPU (Graphics Processing Unit) or dedicated hardware, e.g., FPGA (Field Programmable Gate Array).

The sampling information is input in the form of raw data, a B-splaine volume or mathematical equations. If no sampling information is input, cosine weighted uniform hemisphere sampling is used as a default.

If the sampling information is given in the form of a B-spline volume, the sampling calculation unit 320 generates real sampling information via B-spline evaluation by using two pairs of random number generators.

Meanwhile, while the material information calculation unit 262 forming the material information generating unit 260 of the material information processing unit 20 performs multi-resolution and material mixing, the multi-resolution and material mixing can be also calculated during the calculation of rendering.

The user performs rendering again by adjusting the lighting of the scene information input unit 120 or modifying the material information via the material information editing unit 261, while seeing an image outputted through the image output unit 520 with the help of the material information visualization unit 510. The effect of changing the material information via special pre-processing procedures can be checked in real time via the image output unit 520.

While the invention has been shown and described with respect to the embodiments, it will be understood by those skilled in the art that various changes and modification may be made without departing from the scope of the invention as defined in the following claims.

What is claimed is:

1. An image synthesis apparatus comprising:
at least one computer processor to provide:
an input unit to receive from a user selected information on material information processing, sampling and rendering;
a material information processing unit to convert measured material data into raw material data including measured Bi-directional Reflectance Distribution Function (BRDF) values, perform material model fitting on the raw material data to generate material information and perform material mixing on the material information to generate mixed material information, wherein the model fitting and the material mixing is performed according to the selected information;
a sampling unit to sample the raw material data to generate sampling information in proportion to the measured BRDF values, the sampling unit including:
a tabular cumulative density function calculator using cosine values of inverse altitudes as weights due to characteristics of a rendering equation, to generate a tabular-type cumulative density function on the raw material data and calculate an inverse function of the cumulative density function, and
a tabular sampling calculator to apply the cumulative density function to generate the sampling information;
a materials properties rendering unit to render scene information contained in the selected information, the mixed material information and the sampling information to generate surface material information; and
an output unit to visualize the material information and the surface material information.

2. The image synthesis apparatus of claim 1, wherein the material information processing unit includes:
- a material measuring unit to measure materials properties from physical material samples and materials properties models to obtain the measured material data;
- a material information pre-processing unit to convert the measured material data into the raw material data;
- a material model fitting unit to extract model parameters while performing the material model fitting; and
- a material information generating unit to perform the material mixing by using the extracted model parameters to generate the mixed material information.

3. The image synthesis apparatus of claim 2, wherein the material model fitting unit includes at least one of a tabular material model fitting unit, a B-spline material model fitting unit, an empirical material model fitting unit and a physical material model fitting unit.

4. The image synthesis apparatus of claim 3, wherein the B-spline material model fitting unit performs multi-dimensional B-spline volume fitting by using model fitting control information contained in the selected information and the raw material data.

5. The image synthesis apparatus of claim 2, wherein the material information generating unit includes:
- a material information editing unit to provide via the input unit or the output unit a user interface to receive the selected information on the material mixing; and
- a material information calculation unit to perform at least one of linear mixing, partial mixing, hierarchical mixing and composite mixing according to the selected information received via the user interface to generate the mixed material information.

6. The image synthesis apparatus of claim 5, wherein the material information calculation unit includes:
- at least one of a linear mixing calculator to perform the linear mixing, a partial mixing calculator to perform the partial mixing, a hierarchical mixing calculator to perform the hierarchical mixing and a composite mixing calculator to perform the composite mixing;
- a multi-resolution calculator to adjust image precision according to characteristics of geometric elements of a corresponding scene; and
- a color adjustment calculator to replace color elements and adjust color intensities.

7. The image synthesis apparatus of claim 1, wherein the sampling unit includes:
- a sampling pre-processing unit including the tabular cumulative density function calculator; and
- the tabular sampling calculator samples important incident angles via a random-number generator by applying the cumulative density function to input vector sampling and a B-spline sampling calculator to generate the sampling information by performing B-spline volume fitting on the sampled important incident angles.

8. The image synthesis apparatus of claim 7, wherein the sampling pre-processing unit calculates a marginal density function by mathematically integrating B-spline volumes of the raw material data.

9. The image synthesis apparatus of claim 7, wherein the sampling pre-processing unit has an empirical cumulative density function calculator and a physical cumulative density function calculator to calculate an empirical cumulative density function and a physical cumulative density function, respectively, for the raw material data represented by mathematical equations; and
- wherein the sampling calculation unit has an empirical sampling calculator to sample the empirical cumulative density function and a physical sampling calculator to sample the physical cumulative density function.

10. The image synthesis apparatus of claim 1, wherein the materials properties rendering unit includes:
- a rendering unit to render the scene information, the mixed material information and the sampling information to generate the surface material information; and
- a surface material rendering unit to render the surface material information to generate an image and providing the image to the output unit.

11. An image synthesis method comprising:
- converting, by a computer, measured material data including measured Bi-directional Reflectance Distribution Function (BRDF) values into raw material data;
- generating, by a computer, material information by performing material model fitting on the raw material data according to selected information received from a user;
- generating, by a computer, mixed material information by performing material mixing on the material information according to the selected information;
- generating, by a computer, sampling information by sampling the raw material in proportion to the measured BRDF values, said generating sampling information including
  - using cosine values of inverse altitudes as weights due to characteristics of a rendering equation, to generate a tabular-type cumulative density function on the raw material data and calculate an inverse function of the cumulative density function, and
  - applying the cumulative density function to generate the sampling information; and
- generating, by a computer, surface material information by rendering scene information contained in the selected information, the mixed material information and the sampling information.

12. The image synthesis method of claim 11, wherein said generating the mixed material information includes performing the material mixing by using model parameters extracted while performing the material model fitting.

13. The image synthesis method of claim 12, wherein the material model fitting includes at least one of tabular material model fitting, B-spline material model fitting, empirical material model fitting and physical material model fitting.

14. The image synthesis method of claim 13, wherein the B-spline material model fitting is multi-dimensional B-spline volume fitting using model fitting control information contained in the selected information and the raw material data.

15. The image synthesis method of claim 12, wherein the material mixing includes at least one of linear mixing, partial mixing, hierarchical mixing and composite mixing.

16. The image synthesis method of claim 15, wherein said generating the mixed material information includes:
- adjusting image precision according to characteristics of geometric elements of a corresponding scene;
- replacing color elements; and
- adjusting color intensities.

17. The image synthesis method of claim 11, wherein said generating the sampling information includes:
- sampling important incident angles via a random-number generator by applying the cumulative density function to input vector sampling; and
- performing B-spline volume fitting on the sampled important incident angles to generate the sampling information.

18. The image synthesis method of claim 17, wherein said calculating the inverse function includes calculating a marginal density function by mathematically integrating B-spline volumes of the raw material data.

19. The image synthesis method of claim 17, wherein said calculating the inverse function includes calculating an empirical cumulative density function and a physical cumulative density function for the raw material data represented by mathematical equations; and wherein said performing the B-spline volume fitting includes sampling the empirical cumulative density function calculator and sampling the physical cumulative density function.

20. The image synthesis method of claim 11, the method further comprising:

generating an image by rendering the surface material information; and visualizing the image.

\* \* \* \* \*